United States Patent
Michaelraj et al.

(10) Patent No.: US 9,792,487 B2
(45) Date of Patent: Oct. 17, 2017

(54) SYSTEM AND METHOD FOR DETERMINING DIMENSIONS OF AN OBJECT IN AN IMAGE

(71) Applicant: Dell Products, LP, Round Rock, TX (US)

(72) Inventors: Jeyprakash Michaelraj, San Jose, CA (US); Maxwell S. Andrews, San Francisco, CA (US)

(73) Assignee: Dell Products, LP, Round Rock, TX (US)

( * ) Notice: Subject to any disclaimer, the term of this patent is extended or adjusted under 35 U.S.C. 154(b) by 26 days.

(21) Appl. No.: 14/584,587

(22) Filed: Dec. 29, 2014

(65) Prior Publication Data

US 2016/0188955 A1  Jun. 30, 2016

(51) Int. Cl.
- *G06K 9/32* (2006.01)
- *G06K 9/00* (2006.01)
- *G06K 9/46* (2006.01)
- *G06T 7/62* (2017.01)

(52) U.S. Cl.
CPC ..... *G06K 9/00201* (2013.01); *G06K 9/00214* (2013.01); *G06K 9/3241* (2013.01); *G06K 9/4638* (2013.01); *G06T 7/62* (2017.01); *G06T 2200/24* (2013.01); *G06T 2207/10012* (2013.01); *G06T 2207/10028* (2013.01); *G06T 2207/20104* (2013.01)

(58) Field of Classification Search
CPC ......... G01B 11/002; G06T 7/004; G06T 7/20; G06T 19/00; G06T 2200/24; G06T 2219/008; G06T 2219/012; G06T 2219/2012; G06T 7/60

USPC ......................................................... 382/182
See application file for complete search history.

(56) References Cited

U.S. PATENT DOCUMENTS

| | | | | |
|---|---|---|---|---|
| 6,025,851 | A * | 2/2000 | Valdes | G06T 11/203 345/442 |
| 9,224,060 | B1 * | 12/2015 | Ramaswamy | G06K 9/00912 |
| 2010/0202702 | A1 * | 8/2010 | Benos | G06T 7/602 382/200 |
| 2012/0120196 | A1 * | 5/2012 | Tsai | G06K 9/00778 348/46 |
| 2012/0154576 | A1 * | 6/2012 | Weston | G01B 11/007 348/136 |
| 2012/0176305 | A1 * | 7/2012 | Ryu | G06F 3/017 345/156 |
| 2012/0275661 | A1 * | 11/2012 | Hofman | A01J 5/007 382/110 |
| 2013/0156266 | A1 * | 6/2013 | Horii | G06F 3/012 382/103 |

(Continued)

Primary Examiner — Stephen R Koziol
Assistant Examiner — Shaghayegh Azima
(74) Attorney, Agent, or Firm — Prol Intellectual Property Law, PLLC; H. Kenneth Prol (57) ABSTRACT

An information handling system includes a three dimensional camera and a processor. The three dimensional camera is configured to capture a three dimensional image. The processor is configured to communicate with the three dimensional camera. The processor to provide the three dimensional image to be displayed on a display screen of the information handling system, to determine three dimensional coordinates for an object within the three dimensional image, and to calculate a dimension of the object based on the three dimensional coordinates.

20 Claims, 4 Drawing Sheets

(56) References Cited

U.S. PATENT DOCUMENTS

| | | | |
|---|---|---|---|
| 2014/0104414 A1* | 4/2014 | McCloskey | G06Q 10/083 348/135 |
| 2014/0104416 A1* | 4/2014 | Giordano | G01B 11/02 348/135 |
| 2014/0337740 A1* | 11/2014 | Kwon | G06F 3/04817 715/728 |
| 2015/0015895 A1* | 1/2015 | Bridges | G01S 17/42 356/614 |
| 2015/0063681 A1* | 3/2015 | Bhardwaj | G06F 17/30277 382/154 |
| 2015/0160005 A1* | 6/2015 | Iwai | G01B 11/25 348/47 |
| 2015/0306824 A1* | 10/2015 | Flores Mangas | B29C 67/0088 700/98 |
| 2016/0005211 A1* | 1/2016 | Sarkis | G06T 19/00 345/419 |

\* cited by examiner

SYSTEM AND METHOD FOR DETERMINING DIMENSIONS OF AN OBJECT IN AN IMAGE

CROSS-REFERENCE TO RELATED APPLICATION(S)

The present application is related to co-pending U.S. patent application Ser. No. 14/584,622, entitled "SYSTEM AND METHOD FOR REDEFINING DEPTH-BASED EDGE SNAPPING FOR THREE-DIMENSIONAL POINT SELECTION" filed on Dec. 29, 2014, the entirety of which is herein incorporated by reference.

FIELD OF THE DISCLOSURE

The present disclosure generally relates to system and method for determining dimensions of an object in an image.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems, such as tablet computers, can include a camera to take pictures, which in turn can be stored within the information handling system. The camera can be a digital camera that can include metadata associated with the image, and the metadata can include different information about the image.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system can include a camera to capture images in the information handling system, such as a three-dimensional (3-D) camera, e.g., a stereo triangulation camera, a sheet of light triangulation camera, a structured light camera, a time-of-flight camera, an interferometry camera, a coded aperture camera, or any other type of 3-D camera known in the art. In an embodiment, a display screen of the information handling system can display an image selected by an individual, such as an image previously captured by the camera. A processor of the information handling system can select an object within the image. In an embodiment, there can be multiple ways that an object in the image can be selected: a processor of the information handling system can automatically select an object; an individual can click on a point in the image; an individual can draw a circle around the object; or the like.

When the processor detects a selection of an object, the processor can detect disparity between pixels of the image to determine an edge of the selected object. This disparity threshold may be determined from 3-D scene information. For example, if a Z-dimension is increased by a large amount between adjacent pixels in an X or Y dimension, this may indicate an edge of an object. The threshold may also be based upon 2-D pixel data in the form of high contrast areas, if there is no significant disparity in 3-D information. For example, a picture hanging on the wall will have very little Z-axis difference between the frame and the wall itself, but will have a clearly visible 2-D border that can be used instead, to determine the bounds of the object. The processor can then determine exact end points for each line that defines a different dimension of the selected object. The processor can then retrieve the (X,Y,Z) coordinates for the different end points. The processor can then calculate a distance between points based on the difference between (X,Y,Z) coordinates of these points. Statistical sampling methods may be employed to sample additional similar points to increase the confidence and accuracy of the computed dimensions. Multiple linear samples may be integrated to display area measurements as well as line measurements. Linear measurements may contain multiple waypoints to allow linear measurements of curved or organically shaped objects. After the distances between the points are calculated, the processor can display a wireframe around the object and include these values as the dimensions of the object along lines of the displayed wireframe. Thus, the information handling system can utilize (X,Y,Z) coordinates of points within a 3-D image displayed on the display screen to calculate and display the dimensions of an object without any interaction from an individual, or with only a single input from the individual to generally suggest an object of interest.

Figure 1:
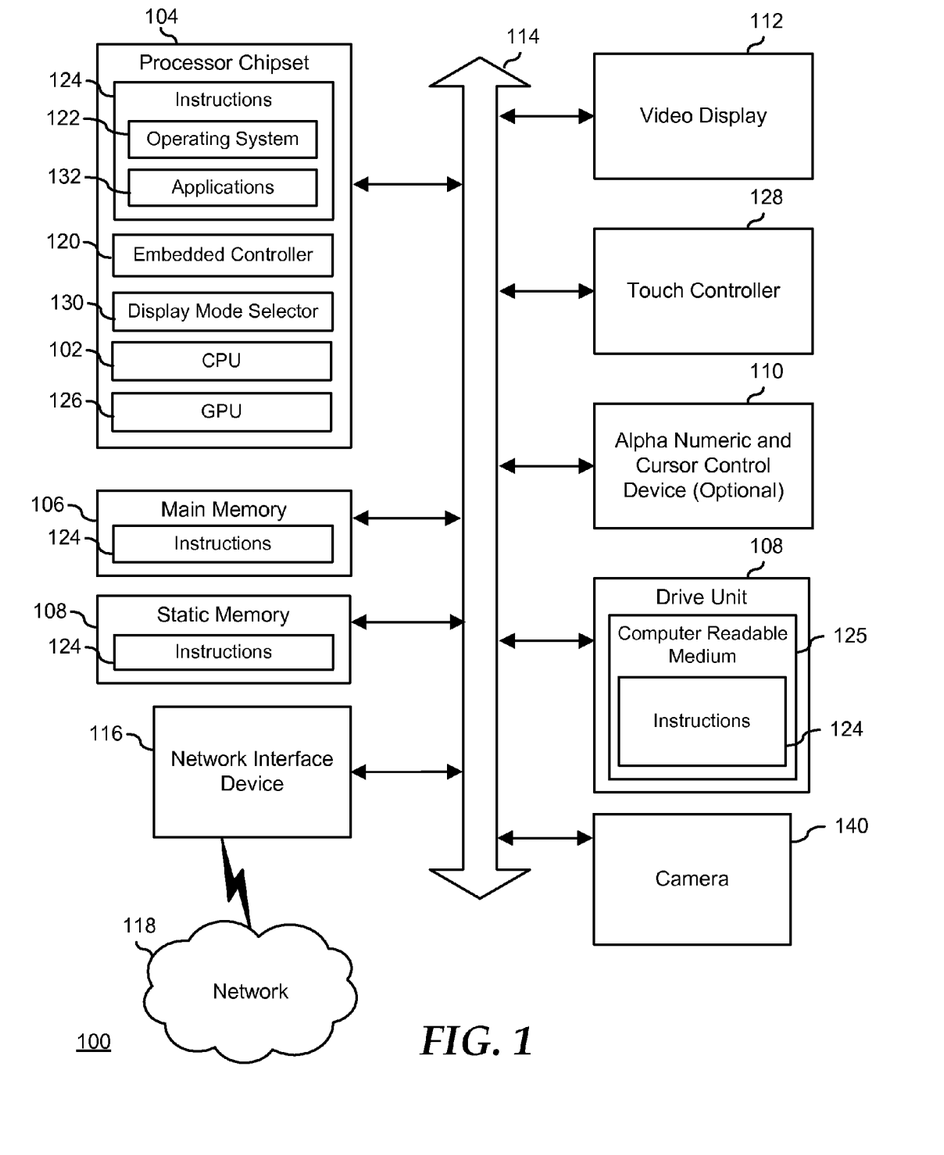
FIG. 1 is a block diagram of an information handling system.

FIG. 1 shows an information handling system 100 including conventional information handling systems components of a type typically found in client/server computing environments. The information handling system 100 may include memory, one or more processing resources such as a central processing unit (CPU) 102 and related chipset(s) 104 or hardware or software control logic. Additional components of system 100 may include main memory 106, one or more storage devices such as static memory or disk drives 108, an optional external input device 110 such as a keyboard, and a cursor control device such as a mouse, or a video display 112. The information handling system 100 may also include one or more buses 114 operable to transmit communications between the various hardware components.

More specifically, system 100 represents a mobile user/client device, such as a dual screen mobile tablet computer. System 100 has a network interface device 116, such as for a wireless cellular or mobile networks (CDMA, TDMA, etc.), WIFI, WLAN, LAN, or similar network connection, enabling a user to communicate via a wired or wireless communications network 118, such as the Internet. System 100 may be configured with conventional web browser software. The web browser, may include for example Microsoft Corporation's Internet Explorer web browser software, Firefox or similar such browsers to allow the user to interact with websites via the wireless communications network 118.

System 100 may include a several sets of instructions 124 to be run by CPU 102 and any embedded controllers 120 on system 100. The instructions 124 can be stored in a computer readable medium 125 of a drive unit 108. One such set of instructions includes an operating system 122 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 124 may be run by system 100. These software applications 124 may enable multiple uses of the dual display information handling system as set forth in more detail below.

System 100 includes a display screen 112. The display screen 112 has a display driver operated by one or more graphics processing units (GPUs) 126 such as those that are part of the chipset 104. The display screen 112 also has an associated touch controller 128 to accept touch input on the touch interface of the display screen.

The display screen 112 may also be controlled by the embedded controller 120 of chipset 108. Each GPU 126 and display driver is responsible for rendering graphics such as software application windows and virtual tools such as virtual keyboards on the display 112. Control of the location and positioning of these windows may be set by user input to locate the screens or by control setting default. In several embodiments described herein, control of the location for rendering for software application windows and virtual tools in the display may be determined by an application window locator system as described further in the embodiments herein. The application window locator system determines operating state rank of running software applications and determines whether and where to display application display windows and virtual tools based on relative orientation and state of usage information. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of display control via the disclosures herein, the power to the display screen 112 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screen and other components of the dual display information handling system.

A display mode selector 130, in connection with an application window locator system as described in more detail below, determines priority of concurrently running software applications and how to automatically locate software application display windows and virtual tools on the screen via the chipset 104 based upon orientation of the display screen 112 as well as the software applications 132 currently running and active and their status. Determining which applications 132 are running determines a working software application context. Alternatively, the application window locator may operate on an embedded controller 120 separate from the main CPU chipset(s) 104. Additionally, the power management application may receive state of usage activity input from device state sensors.

System 100 of the current embodiment has a camera 140 to capture images in the information handling system 100. In an embodiment, the camera 140 can be a three-dimensional (3-D) camera, such that when the camera captures images (X,Y,Z) coordinates for each pixel of the image can be computed and stored. In another embodiment, the GPU 126, or other processor of the information handling system 100, can communicate with the camera 140 to receive the captured images and to calculate the distances for pixels in the newly captured images. The images and associated metadata can be stored in a memory of the information handling system 100, such as a flash memory, the static memory 108, the main memory 106, or the like.

In an embodiment, the camera 140 can be a multiview stereo camera that may include multiple apertures that can each capture the image from a different angle of view with respect to the other apertures of the camera. The different angles of view can cause a shift (parallax) in the (X,Y,Z) coordinates for each pixel in the image. For example, the pixel located at point 201, in FIG. 2, can have coordinates of $(X_1,Y_1,Z_1)$ when captured by a first aperture of the camera 140, can have the coordinates of $(X_2,Y_2,Z_2)$ when captured by a second aperture of the camera, and can have the coordinates of $(X_3,Y_3,Z_3)$ when capture by a third aperture of the camera. The difference, or parallax, between the coordinates from each of the apertures can be utilized to determine an absolute distance that the pixel at point 201 is from the camera 140, in physical units such as metric or imperial units. The calculation of the distance can be based on a calibration file that models the relationship(s) of the aperture(s), stored in a memory of the information handling system 100. In another embodiment, the camera 140 can use any other known method to assign distances to pixels in a 3-D image, such as sonar, radar, or the like, without varying from the scope of this disclosure. In an embodiment, the calibration file can be generated by acquiring multiple images of an object at multiple distances and angles to the camera 140. The calibration file can then model the relative offsets and transforms between the images at multiple distances, and once this relationship is understood, compute a physical dimension from a certain offset of pixels between images.

In an embodiment, the display screen 112 can display an image selected by an individual such as an image previously captured by the camera 140. The GPU 126 can retrieve the image from memory, such as memory 108, and can provide the image to the display screen 112 as shown in FIG. 2.

Figure 2:
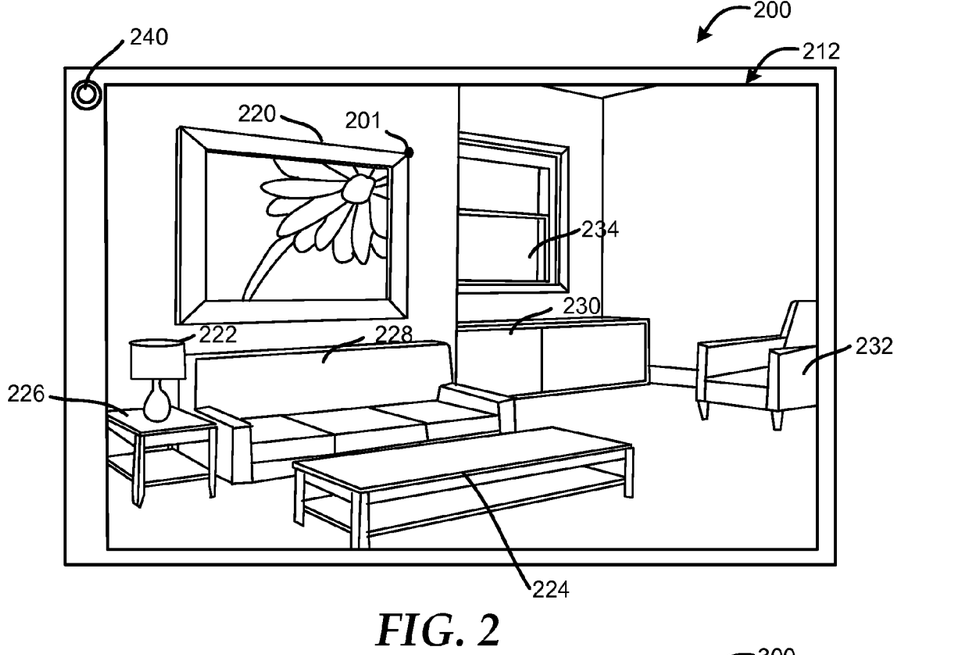
FIGS. 2-5 are diagrams of different screen shots on a display of the information handling system.

FIG. 2 illustrates an information handling system 200 including a display screen 212, which in turn provides a 3-D image according to a particular embodiment of the disclosure. The image displayed on the display screen 212 can include multiple objects, such as a picture 220, a lamp 222, a coffee table 224, an end table 226, a couch 228, a cabinet 230, a chair 232, and a window 234. Depending on the angle that the image is taken from with respect to the objects 220-234, one or more objects, such as the picture 220 and window 234, may not include enough shift in one coordinate to be able to calculate a value for the corresponding dimension. For example, the Z coordinate of the picture 220 may not have enough disparity be able to separate the depth of the picture from the wall on which it is mounted. A processor of the system 100, such as the CPU 102, the GPU 126, the embedded controller 120, or the like, can operate to interface with the touch controller 128 to receive and process inputs received on the display screen 212 from an individual. For example, the processor 102 can interface with the touch controller 128 to receive a selection of an object within the image and an input indicating that the individual would like to have the dimensions of the selected object calculated. However, as discussed below, the dimensions of an object can only be calculated if at least one edge of each dimension is visible in the image. In another embodiment, the processor 102 can automatically select an object in the image and calculate the dimensions of the object without any interaction with the individual.

Figure 3:
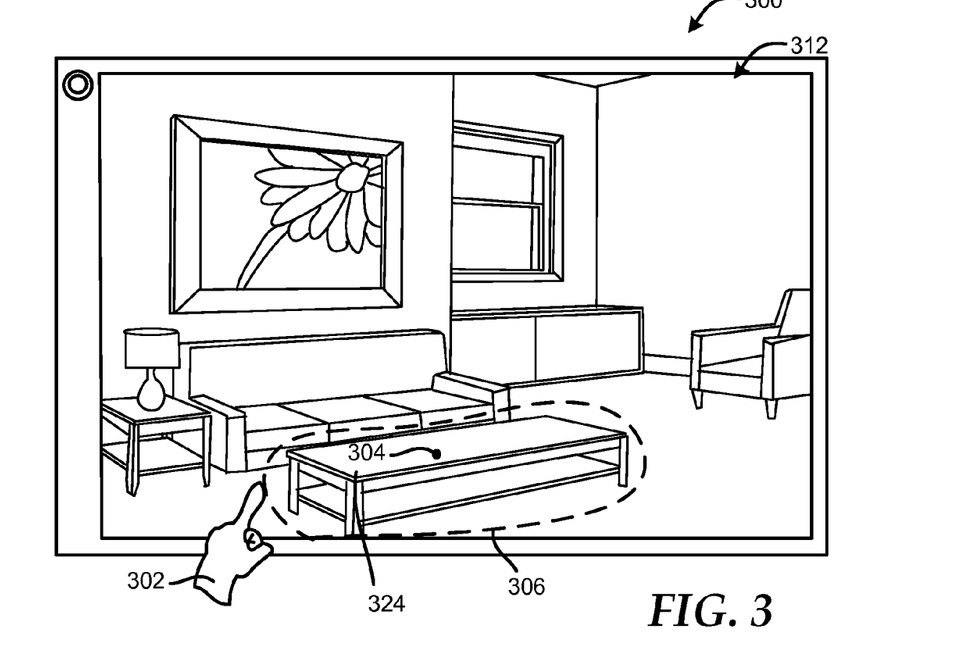

FIG. 3 illustrates an information handling system 300 including a display screen 312, which in turn provides a 3-D image according to a particular embodiment of the disclosure. In this embodiment, an individual can utilize his or her finger 302 to interface with the display 312 and the touch controller 128, of FIG. 1, to select an object within the displayed image that the individual would like to have the dimensions of calculated. In an embodiment, the individual can place the information handling system 200 into an object selection mode while viewing the image on the display screen 312, can open the image in a particular application 132 for selection of an object, or the like. In an embodiment, during the object selection mode there can be multiple ways that an object in the image can be selected: a processor of the information handling system can automatically select a prominent object; an individual can click on a point 304 in the image; an individual can draw a circle 306 around the object; or the like.

When an individual clicks on a particular point 304 in the image to select an object, such as the table top of coffee table 324, a processor of the information handling system 300 can then determine an object associated that the point 304. The individual can click on the point 304 by utilizing a mouse or other pointing device, the finger 302, a stylus, or the like. If the individual chooses to draw the circle 306 around the desired object, the individual can use a pointing device, finger 302, stylus, or the like. In response to the selection 306 being drawn, the processor 102 can determine an object located entirely or partially within the selected area. The processor 102 can then determine whether at least two endpoints of each dimension of the selected object are visible in the image. For example, the table 324 has two legs that are fully visible so that the height of the table can be determined, and the entire table top is visible to calculate the length and width of the table.

If a processor of the information handling system 300 is configured to automatically determine an object, the processor can determine a prominent object of the image that has at least two endpoints of each dimension visible. Thus, the processor 102 can identify a selected object with either no interaction from the individual, such as automatic selection, or only one interaction from the individual, such as clicking a point or drawing an arbitrary selection. After the processor 102 makes a determination of an object selected by the individual or the processor itself, the processor can determine end points for different lines that define the dimensions of the object. For example, the processor can determine that points 402 and 404 are end points for the depth or width of the table 324, that points 404 and 406 are end points for the length of the table, and that points 406 and 408 are end points for the height of the table as shown in FIG. 4.

Figure 4:
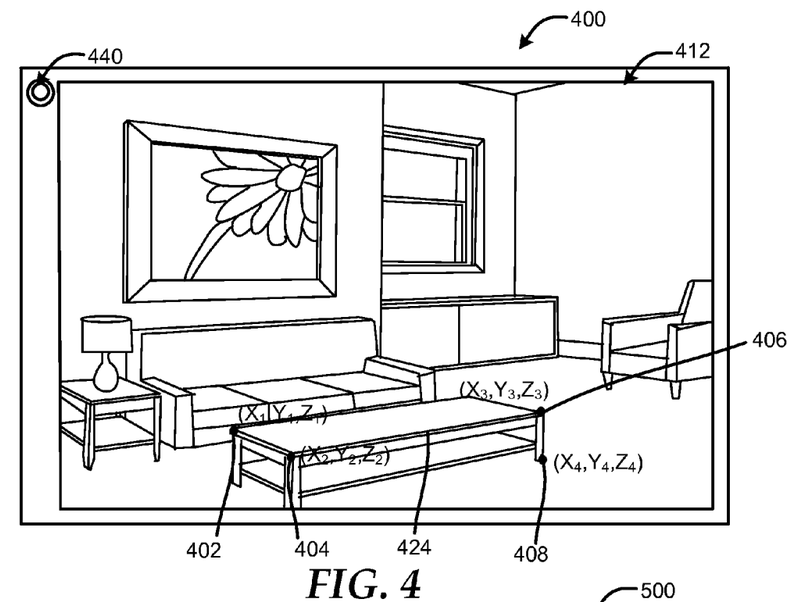

FIG. 4 illustrates an information handling system 400 including a camera 440 and a display screen 412, which in turn provides a 3-D image according to a particular embodiment of the disclosure. The processor 102, of FIG. 1, of the information handling system 400 can determine the outer most points for each line defining a particular dimension of the desired object, such as table 424. For example, the processor 102 can determine that points 402 and 404 are the outer most points of a line defining the depth or width of the table 424, that points 404 and 406 are the outer most points of a line defining the length of the table 424, and that points 406 and 408 are the outer most points on a line that defines the height of the table 424. In different embodiments, the processor 102 can either display the points 402-408 on the image, or can determine the points without displayed the points on the image. However, for clarity, the points 402-408 are shown in FIG. 4 and will be discussed with reference to FIG. 4.

In an embodiment, the processor 102 can detect disparities between the pixels at each end of the line defining the depth or width of the table 424. For example, the Z-dimension of adjacent pixels many have a large disparities, such that there is a large difference between the Z coordinate of one pixel as compared to an adjacent pixel. In another embodiment, the detected disparity can be a large change in the color of pixels from one pixel to the next adjoining pixel. Thus, the processor 102 can determine that points 402 and 404 are the pixels that are located at the end of the line defining the depth or width of the table 424. The processor 102 can then determine the distance each of the points 402 and 404 is within the image based on the (X,Y,Z) coordinates for points 402 and 404. For example, if the camera 440 is a multi-view camera with multiple apertures, the coordinates for point 402 can be $(X_{1a},Y_{1a},Z_{1a})$, $(X_{1b},Y_{1b},Z_{1b})$, and $(X_{1c},Y_{1c},Z_{1c})$. The camera 140, or the processor 102, can determine a shift in each of these coordinates, and can then compare the detected shift in the coordinates for point 402 to the calibration file to determine the absolute distance point 402 is within the image.

The processor 102 can then detect the coordinates for point 404 as generated from each of the lenses of the camera 440. For example, the coordinate for point 404 can be $(X_{2a},Y_{2a},Z_{2a})$, $(X_{2b},Y_{2b},Z_{2b})$, and $(X_{2c},Y_{2c},Z_{2c})$. The camera 140, or the processor 102, can determine a shift in each of these coordinates, and can then compare the detected shift in the coordinates for point 404 to the calibration file to determine the distance point 404 is within the image. The processor 102 can then calculate a distance between points 402 and 404 based on the difference between the determined distances of points 402 and 404. The processor 102 can then store a value for the distance between points 402 and 404 as the width of the table 424.

The processor 102 can utilize the previously determined distance of point 404 for the calculation of the length of the table 424. The processor 102 can then determine the distance the point 406 is within the image based on the (X,Y,Z) coordinates for point 406. For example, the coordinates for point 406 can be $(X_{3a},Y_{3a},Z_{3a})$, $(X_{3b},Y_{3b},Z_{3b})$, and $(X_{3c},Y_{3c},Z_{3c})$. The camera 140, or the processor 102, can determine a shift in each of these coordinates, and can then compare the detected shift in the coordinates for point 406 to the calibration file to determine the distance point 406 is within the image. The processor 102 can then calculate a distance between points 404 and 406 based on the difference between the determined distances of points 404 and 406. The processor 102 can then store a value for the distance between points 404 and 406 as the length of the table 424.

While calculating the height of the table 424, the processor 102 can utilize the previously determined distance of point 406. The processor 102 can then determine the distance each of the point 408 is within the image based on the (X,Y,Z) coordinates for point 406. For example, the coordinates for point 406 can be $(X_{4a},Y_{4a},Z_{4a})$, $(X_{4b},Y_{4b},Z_{4b})$, and $(X_{4c},Y_{4c},Z_{4c})$. The camera 140, or the processor 102, can determine a shift in each of these coordinates, and can then compare the detected shift in the coordinates for point 408 to the calibration file to determine the distance point 408 is within the image. The processor 102 can then calculate a distance between points 406 and 408 based on the difference between the determined distances of points 406 and 408. The processor 102 can store the width, length, and height of the table 424 in a memory, such as memory 108 of FIG. 1, for later use.

Figure 5:
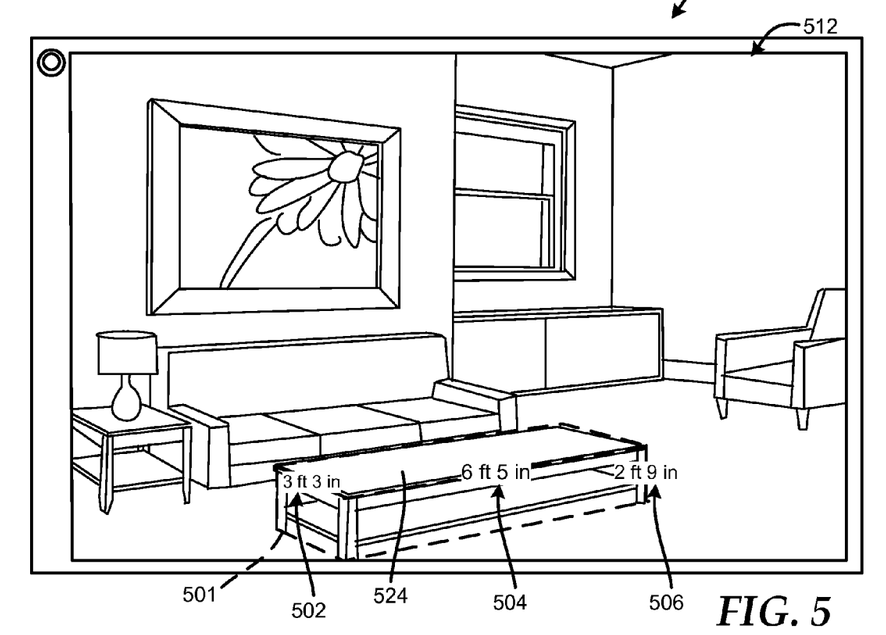

FIG. 5 illustrates an information handling system 500 including a display screen 512, which in turn provides a 3-D image according to a particular embodiment of the disclosure. As described above with respect to FIG. 4, a processor, such as processor 102 in FIG. 1, of the information handling system 500 can utilize the (X,Y,Z) coordinates of points at both ends of a width dimension, the (X,Y,Z) coordinates of points at both ends of a length dimension, and the (X,Y,Z) coordinates of points at both ends of a height dimension to calculate the dimensions of an object, such as table 524. After the dimensions of the table 524 have been calculated and stored, the processor 102 can display the values for each dimension along with lines defining the directions of the dimensions in a wireframe 501.

For example, within wireframe 501 a width 502 of the table 524 can be displayed as 3 ft. 3 in. along a line defining the width of the table, a length 504 can be displayed as 5 ft. 5 in. along a line defining the length of the table, and a height 506 can be displayed as 2 ft. 9 in. along a line defining the height of the table. An individual can view the width 502, the length 504, and the height 506 of the table 524 on the display screen 512, and can easily identify which dimension is defined as which based on the line drawn in relation to the value displayed for the dimension. Thus, the information handling system 500 can utilize (X,Y,Z) coordinates of points within a 3-D image displayed on the display screen 512 to calculate and display the width 502, the length 504, and the height 506 of an objected with only a single interaction with the individual or without any interaction with the individual.

Figure 6:
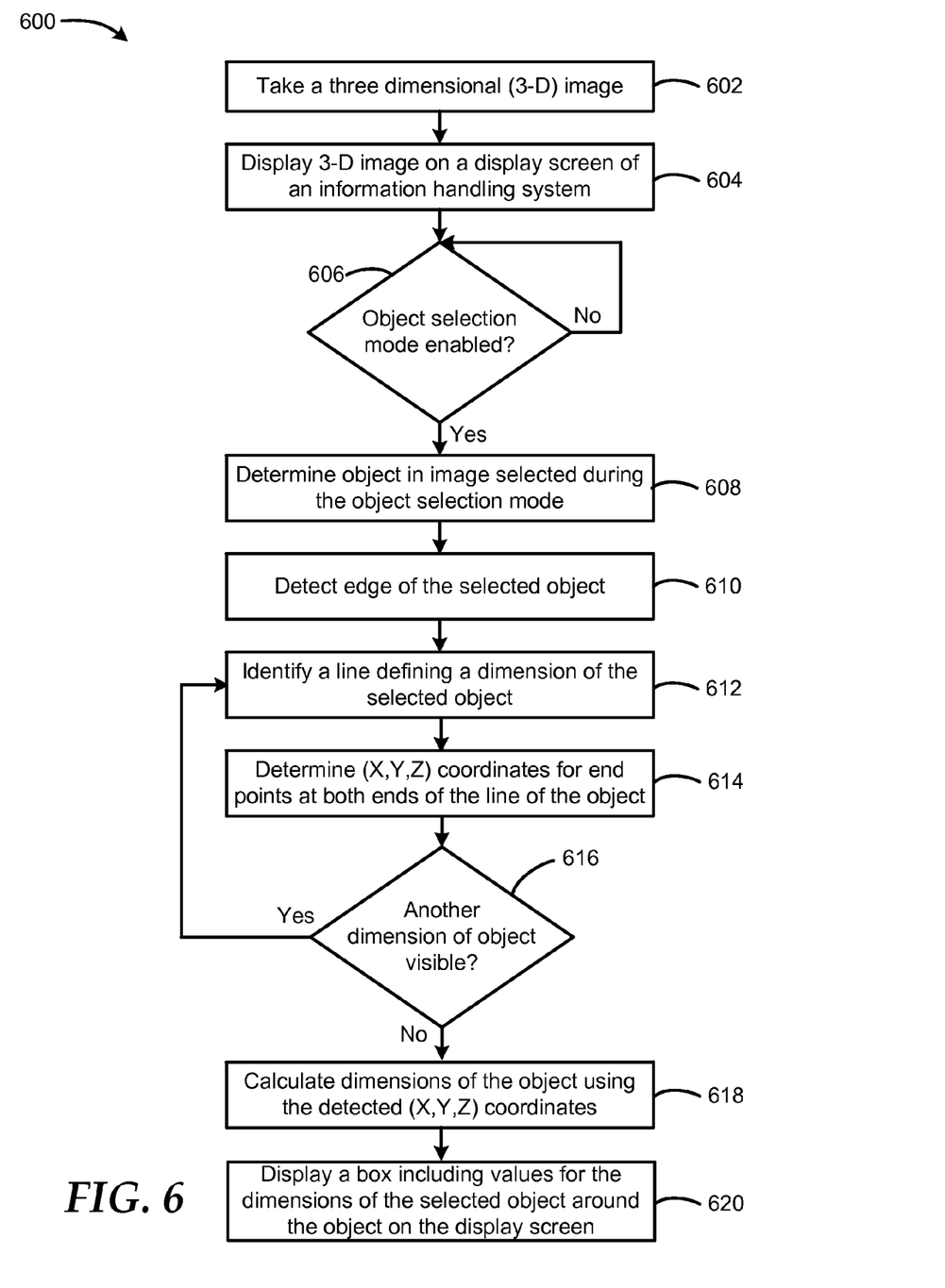
FIG. 6 is a flow diagram of a method for determining the dimensions of an object in an image.

FIG. 6 shows a flow diagram of a method 600 for determining dimensions of an object in an image. At block 602, a three dimensional (3-D) image is taken. In an embodiment, the 3-D image can be taken using a camera incorporated in an information handling system, such as a tablet computer, a cellular telephone, a personal computer, or the like. Metadata including 3-D coordinates for each pixel of the image can be stored along with the 3-D image for later use by the information handling system. At block 604, the 3-D image is displayed on a display screen of the information handling system. A determination is made, at block 606, whether an object selection mode is selected. In an embodiment, the object selection mode can be a user interface application executed by a processor, such as a CPU, GPU, or the like, of the information handling system.

In response to the object selection mode being selected, a determination is made that an object in the image is selected at block 608. In an embodiment, the object can be selected in multiple ways: one or more objects can be automatically selected by a processor of the information handling system, in response to a selection drawn around or near an object on the image, in response to touching of a point on the image, or the like. In an embodiment, a processor of the information handling system can determine a prominent object within the 3-D image, and can automatically select the prominent object as the determined object of the 3-D image. In an embodiment, the object can be encompassed by a selection or a point can be clicked during the object selection mode via an individual using a finger, stylus, or other touch screen input device to draw a selection around some portion of a desired object in the 3-D image. In an embodiment, the object can be selected in response to a selection indication be drawn near the object. The selection indication can be any type of curved line, semi-curved line, shape, semi-shape, or the like being drawn on the object, within the object, around the object, partially around the object, partially within and partially outside of the object or the like.

At block 610, an edge of the selected object is determined. In an embodiment, the edge can be determined based on disparities between pixels of the image. A line defining a dimension of the selected object is identified at block 612. At block 614, the 3-D (X,Y,Z) coordinates for points at both ends of a line defining the dimension of the object are determined. For example, if the object selected is a table, the line of the object can be a first edge of the table top, and the 3-D coordinates can be determined at both ends of the first edge, such as the 3-D coordinates at a first corner of the table and a 3-D coordinates at a second corner of the table. Thus, an edge of an object does not need to be continuous as long as the start and end points are unobscured.

At block 616, a determination is made whether another dimension of the desired object is visible. If another dimension of the object is visible, the flow continues as stated above at block 612. However, if another dimension of the object is not visible, such as the 3-D coordinates for all dimensions of the object have been determined, the dimensions of the object are calculated using the 3-D (X,Y,Z) coordinates at block 618. At block 620, a shape is displayed on the image around the determined object of the image, and the shape can include values representing the dimensions of the object. In an embodiment, the displayed shape can be a dashed line or other wireframe outlining the object that the processor has determined the dimensions of.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a three dimensional camera to capture a three dimensional image including a plurality of three dimensional coordinates associated with an array of pixels of the three dimensional image;
    a processor configured to communicate with the three dimensional camera; and
    the processor executing code instructions to display the three dimensional image on a display screen of the information handling system, to identify an object depicted within the three dimensional image, to automatically select object pixels within the three dimensional image, to determine a plurality of three dimensional coordinates among the object pixels within the three dimensional image, and to calculate a dimension of the object based on the three dimensional coordinates of the object pixels depicting the identified object.

2. The information handling system of claim 1, wherein the processor an input for automatically selecting the object pixels within the three dimensional image of the object being determined.

3. The information handling system of claim 1 wherein the processor is further configured to determine a selected object within the three dimensional image, wherein the processor detects a selection indication being drawn via a touch input on the display screen to identify a location of the object within the three dimensional image.

4. The information handling system of claim 1, wherein the plurality of three dimensional coordinates for a pixel within the three dimensional image are from different lenses of the three dimensional camera.

5. The information handling system of claim 1, wherein the plurality of three dimensional coordinates are X,Y,Z coordinates of points at both ends of a line defining a dimension of the object.

6. The information handling system of claim 5, wherein determined distances of the points at both ends of the line are determined based on a calibration file and shifts in the X,Y,Z coordinates of the points.

7. The information handling system of claim 1 wherein the processor is further configured to determine a selected object within the three dimensional image, wherein the processor detects a touch input on the display screen to identify a location of the object within the three dimensional image.

8. A computer implemented method comprising:
    displaying a three dimensional image on a display screen in an array of pixels wherein the pixels include three dimensional coordinates;
    identifying, via processor executing code instructions, an object depicted within pixels of the three dimensional image;
    automatically selecting, via the processor, the object;
    determining, via a processor executing code instructions, a plurality of three dimensional coordinates for the object depicted within the three dimensional image; and
    determining, via the processor executing code instructions, a dimension of the object based on the three dimensional coordinates associated with at least two pixels of the object depicted in the three dimensional image.

9. The computer implemented method of claim 8 further comprising:
    receiving input from an input device automatically selecting, the object.

10. The computer implemented method of claim 8 further comprising:
    detecting a selection indication being drawn via a touch input on the display screen, wherein the selection indication identifies a location of the object within the three dimensional image.

11. The computer implemented method of claim 8, wherein the plurality of three dimensional coordinates for a pixel within the three dimensional image are from different lenses of a three dimensional camera.

12. The computer implemented method of claim 8, wherein the plurality of three dimensional coordinates are X,Y,Z coordinates of points at both ends of a line defining a dimension of the object.

13. The computer implemented method of claim 12, wherein determined distances of the points at both ends of the line are determined based on a calibration file and shifts in the X,Y,Z coordinates of the points.

14. The computer implemented method of claim 8, further comprising:

detecting, via the processor, a touch input on the display screen to identify a location of the object within the three dimensional image.

15. An information handling system comprising:

a display screen to display a three dimensional image in an array of pixels having associated three dimensional coordinates;

a processor to communicate with the display screen; and the processor executing code instructions to identify an object depicted within the array of pixels of the three dimensional image, to automatically select object pixels within the three dimensional image, to determine three dimensional coordinates for a plurality of object pixels depicting the object in the three dimensional image, and to determine a dimension of the object based on a distance between the three dimensional coordinates for the plurality of object pixels depicting object.

16. The information handling system of claim 15, wherein the processor receives an input for automatically selecting the object.

17. The information handling system of claim 15, further comprising:

a touch controller to communicate with the display screen, the touch controller to detect a touch input on the display screen; and the processor is further configured to determine a selection object within the three dimensional image, wherein the processor detects a selection indication being drawn via the touch input on the display screen to identify a location of the object within the three dimensional image.

18. The information handling system of claim 15, wherein the three dimensional coordinates for the pixel within the three dimensional image are from different lenses of the three dimensional camera.

19. The information handling system of claim 15, wherein the plurality of three dimensional coordinates for the object are X,Y,Z coordinates of points at both ends of a line defining a dimension of the object.

20. The information handling system of claim 19, wherein determined distances of the points at both ends of the line are determined based on a calibration file and shifts in the X,Y,Z coordinates of the points.

* * * * *